US011994240B2

(12) United States Patent
Clement et al.

(10) Patent No.: US 11,994,240 B2
(45) Date of Patent: May 28, 2024

(54) INSULATING COVER FOR A SUBMERGED ELEMENT OF A FLUID EXPLOITATION FACILITY IN A BODY OF WATER, FACILITY AND ASSOCIATED METHOD

(71) Applicant: TECHNIP N-POWER, Courbevoie (FR)

(72) Inventors: Isabelle Clement, Massy (FR); Xavier Henneuse, Le Trait (FR)

(73) Assignee: TECHNIP N-POWER (FR)

(*) Notice: Subject to any disclaimer, the term of this patent is extended or adjusted under 35 U.S.C. 154(b) by 164 days.

(21) Appl. No.: 17/788,876

(22) PCT Filed: Dec. 24, 2020

(86) PCT No.: PCT/EP2020/087886
§ 371 (c)(1),
(2) Date: Jun. 24, 2022

(87) PCT Pub. No.: WO2021/130376
PCT Pub. Date: Jul. 1, 2021

(65) Prior Publication Data
US 2023/0052668 A1 Feb. 16, 2023

(30) Foreign Application Priority Data
Dec. 27, 2019 (FR) ...................... 1915666

(51) Int. Cl.
*F16L 1/26* (2006.01)
*F16L 1/12* (2006.01)
(Continued)

(52) U.S. Cl.
CPC .................. *F16L 1/26* (2013.01); *F16L 1/123* (2013.01); *F16L 55/17* (2013.01); *F16L 59/026* (2013.01); *F16L 59/165* (2013.01); *F16L 59/168* (2013.01)

(58) Field of Classification Search
CPC ..... F16L 1/123; F16L 1/20; F16L 1/24; F16L 1/26; F16L 59/026; F16L 59/165; F16L 59/168
See application file for complete search history.

(56) References Cited

U.S. PATENT DOCUMENTS 687,389 A * 11/1901 Wilhelmi ............. H02G 3/26
405/172
3,496,963 A * 2/1970 Moody ............... F16L 55/1715
138/99
(Continued)

FOREIGN PATENT DOCUMENTS

FR 2 605 378 A1 4/1998
WO WO 2008/107542 A2 9/2008
WO WO 2011/046503 A1 4/2011

OTHER PUBLICATIONS

International Search Report dated Mar. 16, 2021 issued in corresponding PCT International Application No. PCT/EP2020/087886.
(Continued)

*Primary Examiner* — Frederick L Lagman
(74) *Attorney, Agent, or Firm* — OSTROLENK FABER LLP

(57) ABSTRACT

A cover that includes a deformable jacket, intended to be placed around the submerged element. The deformable jacket has an internal volume. The cover includes a plurality of insulating elements arranged in the internal volume, able to move freely relative to one another; at least one opening for selective access to the internal volume through the deformable jacket, for allowing the internal volume to be flooded by a liquid during the deployment of the cover towards the submerged element, and for allowing suction of the liquid contained in the internal volume during the application of the cover on the submerged element.

18 Claims, 6 Drawing Sheets

(51) Int. Cl.
*F16L 55/17* (2006.01)
*F16L 59/02* (2006.01)
*F16L 59/16* (2006.01)

(56) References Cited

U.S. PATENT DOCUMENTS

| | | | | | |
|---|---|---|---|---|---|
| 3,650,299 | A | * | 3/1972 | Seiler | F16L 59/04 138/149 |
| 3,699,690 | A | * | 10/1972 | Watter | F16L 1/026 405/157 |
| 3,793,845 | A | * | 2/1974 | Keith | F16L 1/24 114/294 |
| 4,102,137 | A | * | 7/1978 | Porraz | E02B 3/127 405/172 |
| 4,338,045 | A | * | 7/1982 | Cour | F16L 1/20 405/172 |
| 4,477,206 | A | * | 10/1984 | Papetti | F16L 1/24 405/172 |
| 5,385,430 | A | * | 1/1995 | Connors | F16L 1/06 405/172 |
| 6,220,788 | B1 | * | 4/2001 | Jewell | F16L 1/24 405/172 |
| 7,029,205 | B2 | * | 4/2006 | Daigle | E02D 17/202 405/172 |
| 8,651,149 | B2 | * | 2/2014 | Katona | F16L 57/02 138/172 |
| 2004/0086339 | A1 | * | 5/2004 | Tyrer | E21B 17/012 138/140 |

OTHER PUBLICATIONS

Written Opinion dated Mar. 16, 2021 in corresponding PCT International Application No. PCT/EP2020/087886.
Search Report dated Aug. 11, 2020 issued in corresponding French Patent Application No. FR 1915666.

* cited by examiner

INSULATING COVER FOR A SUBMERGED ELEMENT OF A FLUID EXPLOITATION FACILITY IN A BODY OF WATER, FACILITY AND ASSOCIATED METHOD

CROSS-REFERENCE TO RELATED APPLICATIONS

The present application is a 35 U.S.C. § 371 national stage application of PCT/EP2020/087886, filed Dec. 24, 2020, which claims priority to French Patent Application No. FR 1915666, filed Dec. 27, 2019, the contents of which are incorporated herein by reference.

BACKGROUND OF THE INVENTION

The present invention relates to an insulating cover for a submerged element of a fluid exploitation facility in a body of water, comprising:
  a deformable jacket, intended to be placed around the submerged element.

The cover is intended to be applied, for example, to a submerged pipe of a facility for using hydrocarbons.

Facilities of this type typically comprise a bottom assembly for collecting fluid, a surface assembly, for transferring fluid to vessels or pipelines, and fluid transport pipes between the surface assembly and the bottom assembly.

The surface assembly is, for example, a marine surface support, which can be a Floating Production, Storage and Offloading (FPSO) unit or a Floating Liquefied Natural Gas (FLNG) unit, a semi-submersible platform, for example, a Tension Leg Platform (TLP), an offloading buoy, a floating vertical column or a ship. Alternatively, the surface assembly is a jacket-type fixed rigid structure or an oscillating structure secured to the sea bed.

The submerged pipe is in particular a rigid pipe or a flexible pipe. A flexible pipe is in particular as described in the normative documents published by the American Petroleum Institute (API), API 17J (3rd edition—Jan. 1, 2009) and API RP 17B (3rd edition—March 2002) or API 17K (2nd edition—September 2016).

The flexible pipe generally comprises an inner polymeric sheath through which the fluid to be transported flows, armor elements wound on the outside of the inner sheath, and an outer layer, made from a polymeric sheath, which protects the armor elements from water outside the flexible pipe.

A rigid pipe generally comprises at least one inner metal tube for transporting fluid and, optionally, an outer polymeric layer for thermally insulating the pipe.

When the flexible or rigid pipe is submerged in a body of water, it is important to maintain the integrity of the outer layer.

In the case of a flexible pipe, if the outer sheath is pierced, the annular space is likely to be flooded, which may result in corrosion of the armors. This can substantially reduce the lifetime of the flexible pipe.

For rigid or flexible pipes, if the outer layer is damaged, a thermal bridge is created. In this area, local cooling of the pipe can affect the flow of fluid through the pipe, producing hydrate plugs or increasing the viscosity of the fluid and preventing the flow thereof. Such plugs are difficult to treat and, in the worst-case scenario, lead to substantial downtime and high costs.

Damage to the outer layer can be caused in various ways. For example, during the installation of the pipe, contact between the pipe and the tensioners, or the pulleys can lead to damage.

The outer layer can also be degraded by contact with the bottom of the body of water during installation of the pipe, or even during production, especially in the case of lateral looping or crawling of the pipe. It can also be degraded due to improper application of the outer layer during manufacture or due to hydrolysis of the polymer forming the outer layer.

When the outer layer of a pipe is damaged, it is known from WO 2008/107542, for example, to place an underwater clamp around the pipe at the damaged portion.

Such clamps are usually deployed using cranes and are activated under the body of water by remotely operated vehicles. They usually consist of two rigid half-shells defining a conjugate shape with the pipe, which are tightly assembled around the damaged portion of the pipe.

Such clamps are suitable for linear sections of pipe. However, they are not entirely satisfactory.

In order to achieve good insulation, the clamps must be designed and manufactured with a geometry that exactly matches the damaged portion of the pipe. This delays the installation thereof, increases the cost, and requires a very precise installation of the clamp on the pipe, in particular by means of a crane and a remotely operated vehicle.

Moreover, such clamps are not very suitable for complex pipe geometries, for example swan necks. They are also difficult to install in congested areas, such as manifolds, wellheads, or pipe line end terminations (PLETs).

SUMMARY OF THE INVENTION

It is therefore an object of the invention to provide an insulating cover that is simple and inexpensive to design and install, while accommodating a wide variety of configurations of submerged elements to be protected.

To this end, the subject matter of the invention is an insulating cover of the aforementioned type, characterized in that the deformable jacket has an internal volume, the cover comprising:
  a plurality of insulating elements arranged in the internal volume, able to move freely relative to one another;
  at least one opening for selective access to the internal volume through the deformable jacket, for allowing the internal volume to be flooded by a liquid during the deployment of the cover towards the submerged element, and for allowing suction of the liquid contained in the internal volume during the application of the cover on the submerged element.

The insulating cover according to the invention may comprise one or more of the following features, taken alone or in any technically possible combination:
  the internal volume has a plurality of compartments separated from one another, each compartment containing a plurality of insulating elements;
  the compartments are fluidly connected to one another;
  the insulating elements are able to move freely relative to the deformable jacket in the internal volume;
  the insulating elements are made of polymer, in particular polyolefin;
  the insulating elements are separate solid parts, in particular balls or prismatic elements;
  the deformable jacket is made of polymeric material, in particular rubber and/or polyolefin;
  it comprises an access valve that can be activated by a remotely operated vehicle, the access valve being able to selectively close the opening;
  it comprises at least one solid flank extending the deformable jacket;

it comprises at least one fastener integral with the deformable jacket, the fastener being suitable for being gripped by a remotely operated vehicle;

the submerged element is a pipe or a connector.

The invention also has as its subject matter a fluid exploitation facility through a body of water, comprising:

a submerged element;

a cover as defined above, applied on the submerged element.

It is also a subject matter of the invention to provide a method of isolating an element of a fluid operating facility submerged in a body of water, comprising the following steps:

providing a cover as defined above;

flooding the internal volume with a liquid through the access opening;

applying the deformable jacket on the submerged element;

suctioning liquid contained in the internal volume through the access opening;

closing the access opening and keeping the deformable jacket applied on the submerged element.

The method according to the invention may comprise one or more of the following features, taken alone or in any technically possible combination:

the application and suction steps are performed by a remotely operated vehicle.

it comprises a step of additional flooding of the internal volume after the suctioning of liquid contained in the internal volume, and of moving the deformable jacket away from the submerged element.

DESCRIPTION OF THE FIGURES

The invention will be better understood from the following description, given only by way of example, and made with reference to the appended drawings, in which.

DETAILED DESCRIPTION

Figure 1:
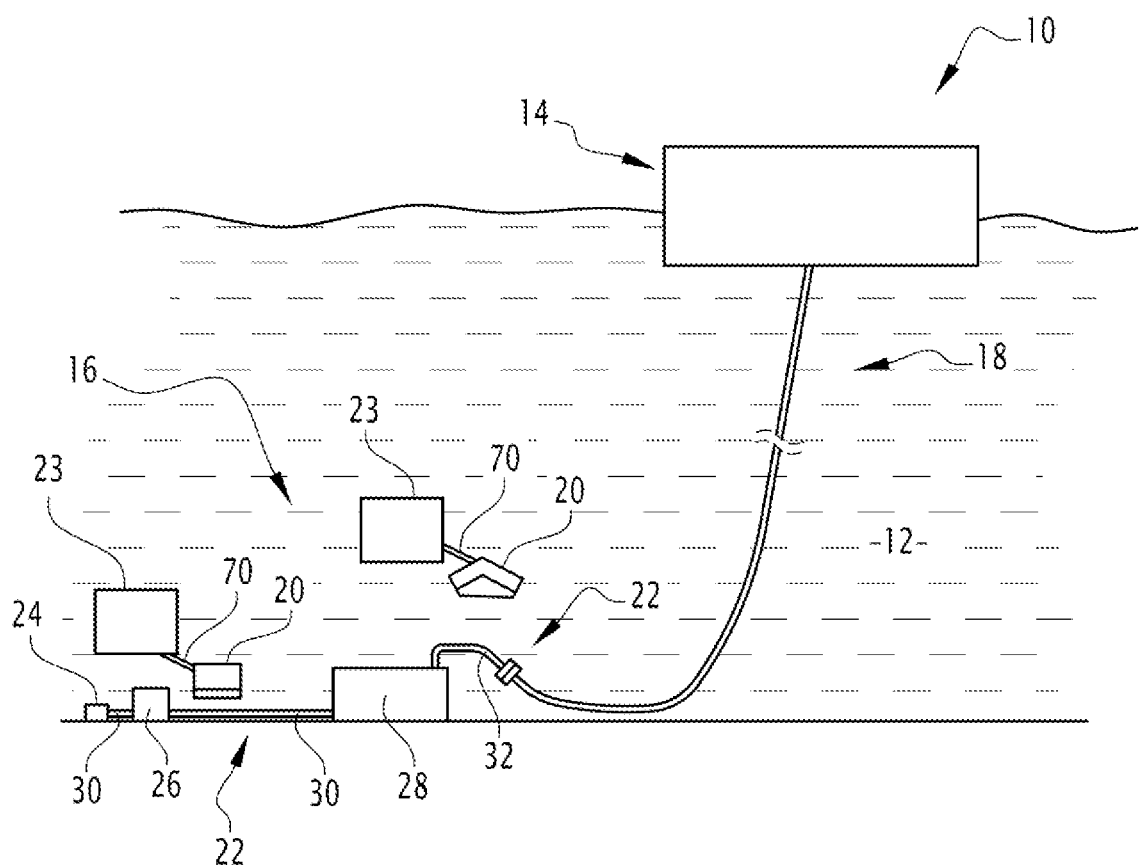
FIG. 1 is a schematic view of a first fluid exploitation facility in a body of water, wherein an insulating cover according to the invention is installed.

A fluid exploitation facility 10 in a body of water 12 is illustrated in FIG. 1.

The body of water 12 is, for example, a lake, river, sea or ocean. The depth of the body of water 12 at the facility 10 is, for example, between 50 m and 3,000 m, or even 4,000 m.

The facility 10 comprises a surface assembly 14, located on the surface of the body of water 12, and a bottom assembly 16 located on the bottom of the body of water 12. Said facility comprises, between the surface assembly 14 and the bottom assembly 16, at least one riser pipe 18 for transporting fluid.

The facility 10 further comprises at least one insulating cover 20 according to the invention, intended to be placed on a submerged element 22 of the facility 10.

The facility 10 also comprises a remotely operated vehicle 23 ("ROV") intended for installing and optionally removing the insulating cover 20 on the submerged element 22.

The fluid produced in the facility 10 is, for example, a hydrocarbon, such as oil and/or natural gas.

The surface assembly 14 is, for example, floating. It is advantageously formed by a marine surface support which can be a Floating Production, Storage and Offloading (FPSO) unit or a Floating Liquefied Natural Gas (FLNG) unit, a semi-submersible platform, which can be, for example, a Tension Leg Platform (TLP), an offloading buoy, a floating vertical column or a ship. Alternatively, the surface assembly 14 is a jacket-type fixed rigid structure or an oscillating structure secured to the sea floor.

In this example, the bottom assembly 16 comprises wellheads 24, at least one manifold 28 and/or a pipe termination 26, connected together by flowlines 30, for example formed of rigid or flexible pipes.

The bottom assembly 16 also comprises in this example a connector 32 for connecting the transport pipe 18 to the manifold 28, the connector 32 here being in the form of a swan neck.

The transport pipe 18 here is a flexible pipe as defined above. It extends between the connector 32 of the bottom assembly 16 and the surface assembly 14. The transport pipe 18 is intended to transport fluid from the bottom assembly 16 to the surface assembly 14 to recover a production fluid such as hydrocarbons, or from the surface assembly 14 to the bottom assembly 16, in the case of an injection fluid.

Alternatively, the transport pipe 18 is a rigid pipe or a hybrid tower comprising a rigid pipe and a surface connection hose.

Figure 2:
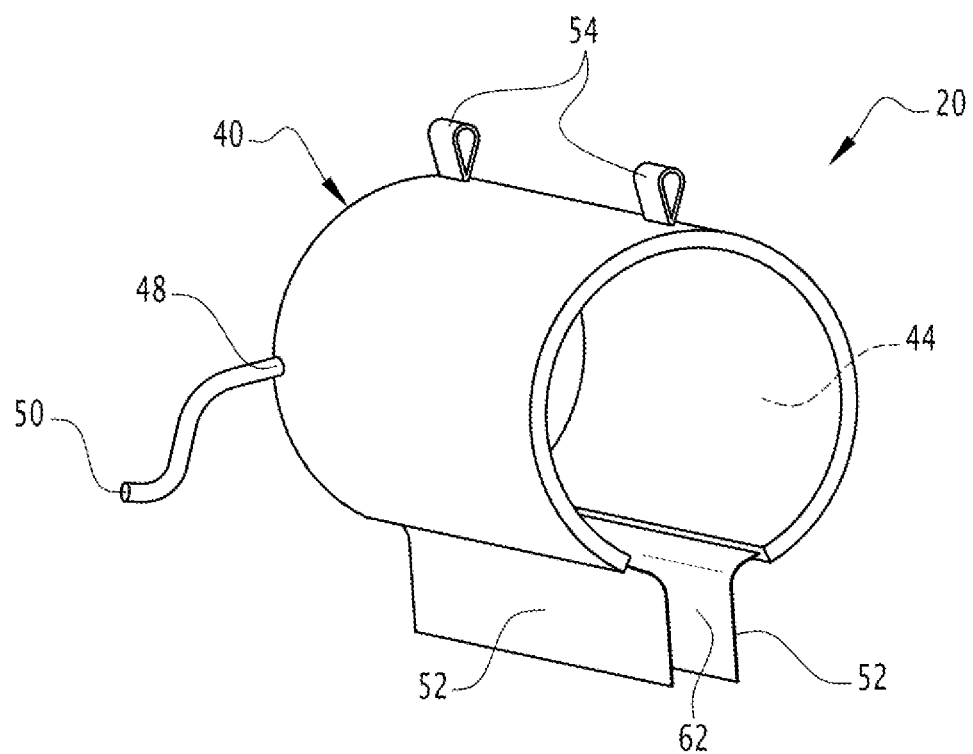
FIG. 2 is a three-quarter perspective view of a first insulating cover according to the invention.
Figure 3:
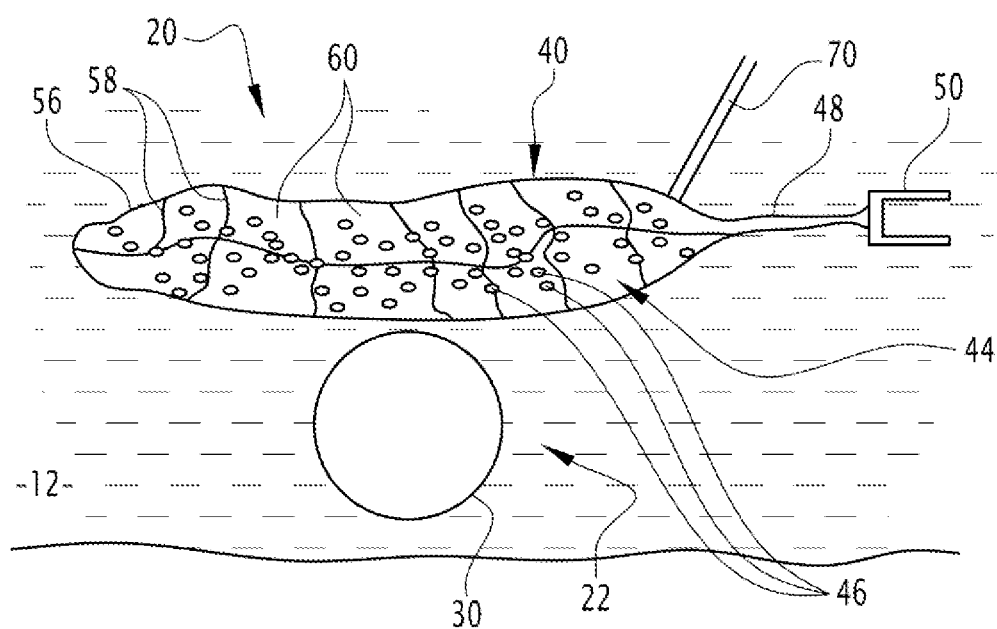
FIG. 3 is a schematic view illustrating the internal volume of an insulating cover according to the invention, once installed around a pipe.
Figure 4:
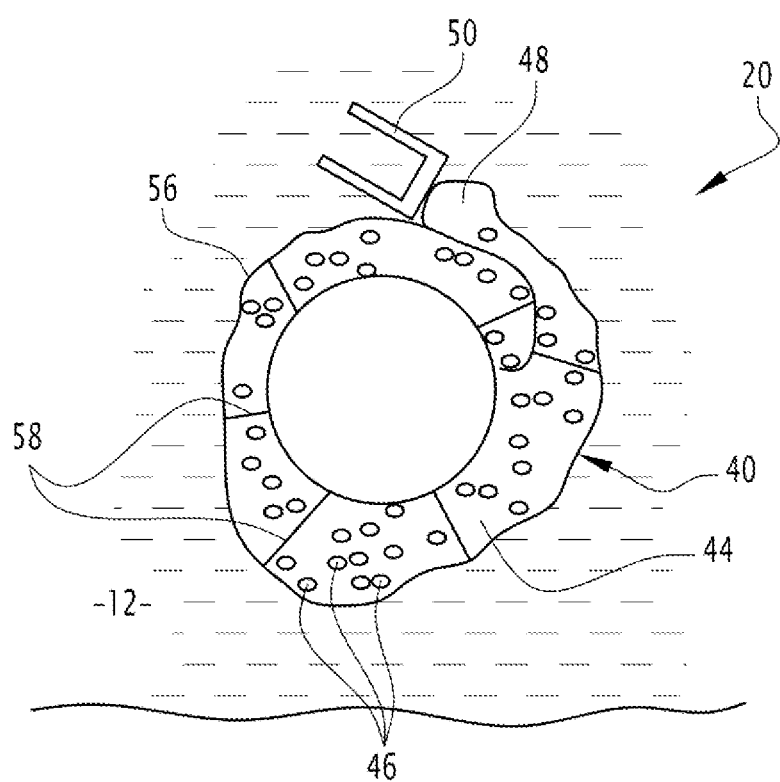
FIG. 4 is a view analogous to FIG. 3, after installation.

With reference to FIGS. 2 to 4, the insulating cover 20 comprises a deformable jacket 40 defining a hollow internal volume 44.

As illustrated in FIGS. 3 and 4, the cover 20 further comprises, within the internal volume 44, a plurality of thermally insulating elements 46. The insulating elements 46 are able to move freely relative to one another within the internal volume 24.

The insulating cover 20 further defines an access opening 48 to the internal volume 44 provided with a valve 50 for selective access to the internal volume 44.

In the example shown in FIG. 2, the insulating cover 20 further comprises, solid flanks 52 projecting on either side of the deformable jacket 40 and fasteners 54 intended to be grasped by the remotely operated vehicle 23 for installation of the insulating cover 20. The flanks 52 are preferably deformable.

The deformable jacket 40 is, for example, made from a deformable double-walled pocket 56 delimiting internally, between the walls of the double wall, the internal volume 44.

Said pocket is, for example, formed from a liquid-tight, in particular water-tight, polymer, in particular from polyolefin such as polypropylene or polyethylene or/and from rubber or textile material.

The jacket 40 is, for example, deformable under the effect of its own weight, or/and by the hand of a user.

The thickness of each wall of the jacket 56 is preferably less than 6 mm and is in particular between 1 mm and 4 mm.

The deformable jacket 40 further comprises inner walls 58 in the internal volume 44. The inner walls 58 are, for example, formed by membranes porous to liquids, in particular to water, and/or by polymeric meshes.

The inner walls 58 delimit between them distinct compartments 60 within the internal volume 44.

The number of compartments 60 in the internal volume 44 is greater than 2, and is between 2 and 40. The volume of each compartment depends on the curvature to be obtained in order to adapt to the submerged structure. It is advantageously less than 10 liters.

The distinct compartments 60 are fluidly connected to one another and are fluidly connected to the access opening 48 directly or through other compartments 60.

Thus, each compartment 60 is suitable for being flooded with a liquid at atmospheric pressure, such as water, prior to deployment in the body of water 12, to expel air from each compartment 60. The flooding is advantageously supplemented with water from the body of water 12 upon immersion of the deformable jacket 40 into the body of water 12.

Each compartment 60 is flooded through the access opening 48 and optionally at least one other compartment 60.

Similarly, the liquid within each compartment 60 is suitable for being suctioned from the access opening 48 and optionally at least one other compartment 60.

The insulating elements 46 are able to move freely within the internal volume 44 relative to one another and relative to the jacket 40, and are advantageously distributed within the compartments 60.

The insulating elements 46 are preferably made of polymer, for example polyolefin such as polypropylene or polyurethane or fluorinated polymer such as polyvinylidene fluoride (PVDF) or synthetic rubber or cork.

The thermal conductivity of the material forming each insulating element is, for example, less than $1.0 \text{ W·m}^{-1}\text{·K}^{-1}$, in particular less than $0.7 \text{ W·m}^{-1}\text{·K}^{-1}$.

This thermal conductivity is, for example, measured at 22° C. according to the ISO 22007-2 standard.

The insulating elements 40 are, for example, balls, cubes or more generally disjointed solid parts, dispersed within the internal volume 44.

The volume of each insulating element 40 is preferably less than 50 cm³ and in particular between 4 mm³ and 4 cm³. The density of insulating elements 40 in the internal volume 44 is, for example, greater than 0.7 times the internal volume 44 after the liquid is suctioned.

The access opening 48 is suitable for allowing flooding of the internal volume 44, and in particular of the separate compartments 60 of the internal volume 44 with a liquid, in particular a liquid introduced on the surface, and/or water from the body of water 12, in particular during the deployment and installation of the insulating cover 20 on the submerged element 22. Said access opening is suitable for suctioning the liquid contained within the internal volume 44 once the cover 20 is installed around the submerged element 22.

The internal volume 44 is delimited in a liquid-tight manner, in particular in a water-tight manner by the deformable jacket 40. It opens outwardly exclusively through the or each access opening 48.

In this example, the access valve 50 is suitable for being manipulated by a remotely operated vehicle 23 to selectively close and open the access opening 48.

It is configured for connection to a suction head of the remotely operated vehicle 43, the suction head being connected to a pump suitable for suctioning liquid from the internal volume 44.

In the example shown in FIG. 2, the deformable jacket 40 has a substantially cylindrical shape open along a longitudinal slot 62 extending along a generatrix. Such a shape is suitable for installation on a linear section of pipe, for example a section of a flowline 30 then forming the submerged element 22 to be protected.

In this example, the solid flanks 52 project along the edges of the slot 62 on either side of the slot 62.

The fasteners 54 are formed by loops attached to the deformable jacket 40. In the example shown in FIG. 2, the loops 40 are attached opposite the slot 62.

The fasteners 54 are suitable for being grasped by an arm 70 of the remotely operated vehicle 23 to allow installation of the deformable jacket 40 around the submerged member 22 through the slot 62.

The installation of an insulating cover 20 according to the invention on a submerged element 22 will now be described.

Initially, the insulating cover 20 is provided at the surface, advantageously with the internal volume 44 thereof free of liquid.

The shape of the deformable jacket 40 may be standardized, for example cylindrical as described in FIG. 2, without necessarily being conjugated to the shape of the submerged element 22 on which it is to be applied.

The internal volume 44 of the deformable jacket 40 is then flooded with a liquid, preferably at atmospheric pressure, through the access opening 48. The liquid is advantageously water.

The liquid floods the compartments 60 and expels the air present in the internal volume 44.

Then, the deformable jacket 40 is submerged with its access valve 50 open to optionally supplement the flooding of the internal volume 44 with water from the body of water 12 through the access opening 48.

The circulation of liquid between the body of water 12 and the internal volume 44 maintains hydrostatic pressure equilibrium during the deployment of the insulating cover 20.

The insulating cover 20 is then lowered into the body of water 12, for example into a basket of the remotely operated vehicle 23. It is easily manipulated during this descent, since it has buoyancy equivalent to water.

Then, as shown in FIG. 3, the insulating cover 20 is deployed over the submerged element 22, here, for example, a flowline 30, and is connected by the fasteners 54 thereof to the arms 70 of the remotely operated vehicle 23.

Next, the deformable jacket 40 is manipulated to surround the submerged element 22 at the area to be isolated, as shown in FIG. 4.

A suction head connected to a suction pump in the remotely operated vehicle 23 is then connected to the access valve 50. The liquid in the internal volume 44 is pumped through the suction pump.

Preferably, more than 50% by volume, in particular more than 80% by volume of the liquid present in the internal volume 44 is pumped out of the internal volume 44 through the pump present in the remotely operated vehicle 23.

The deformable jacket 40 then adjustably applies on the submerged element 22, due to the vacuum created in the internal volume 44.

Furthermore, the insulating elements 46 concentrate and/or aggregate in the internal volume 44 to provide thermal insulation adapted to the shape of the submerged element 22.

The deformable jacket 40 then adopts the shape of the submerged element 22, even if this shape is complex, and the insulating elements 46 are distributed around the area to be protected of the submerged element 22, in the distinct compartments 60 of the internal volume 44.

Pumping the liquid present in the internal volume 44 further limits convection through the liquid within the deformable enclosure 40, since the liquid can no longer flow freely through the internal volume 44.

As a result, highly effective thermal insulation is achieved both by concentrating and/or aggregating the insulating elements 46 and distributing them around the submerged element 22, and by suppressing convection through the liquid.

Next, the remotely operated vehicle 23 closes the access valve 50, which prevents water from entering the internal volume 40 and holds the deformable jacket 40 in place.

The remotely operated vehicle 23 then detaches from the insulating cover 20, which remains in place on the submerged element 22.

If necessary, the insulating cover 20 can be removed by lowering a remotely operated vehicle 23 back into the body of water 12, and then opening the access valve 50 to re-flood the internal volume 44 through the opening 48. Once this is done, the deformable jacket 40 is detached from the submerged element 22 and raised to the surface or replaced on another submerged element 22.

Figure 5:
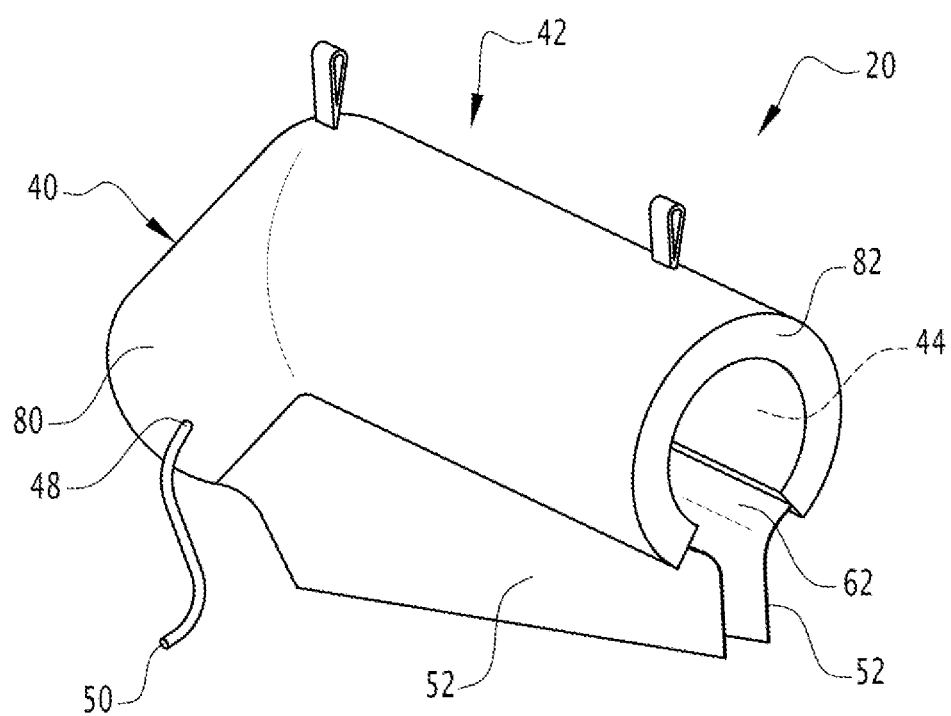
FIG. 5 is a view of a variant of the insulating cover according to the invention.

In the embodiment shown in FIG. 5, the deformable jacket 40 has a first linear section 80 and a second linear section 82 that form an angle greater than 90° between them, in particular between 100° and 140°.

A common slot 62 extends along the sections 80, 82, in a same plane shown vertical here. The slot 62 is located opposite the apex of the angle formed by the sections 80, 82.

The flanks 52 extend along the edges of the slot 62 and thus have a triangular region along the edges of the slot 62.

This deformable jacket 40 is particularly suitable for installation around a swan neck connector 32 which then forms the submerged element 22.

The installation of the insulating cover 20 shown in FIG. 5 is otherwise analogous to the installation of that shown in FIG. 2.

Figure 6:
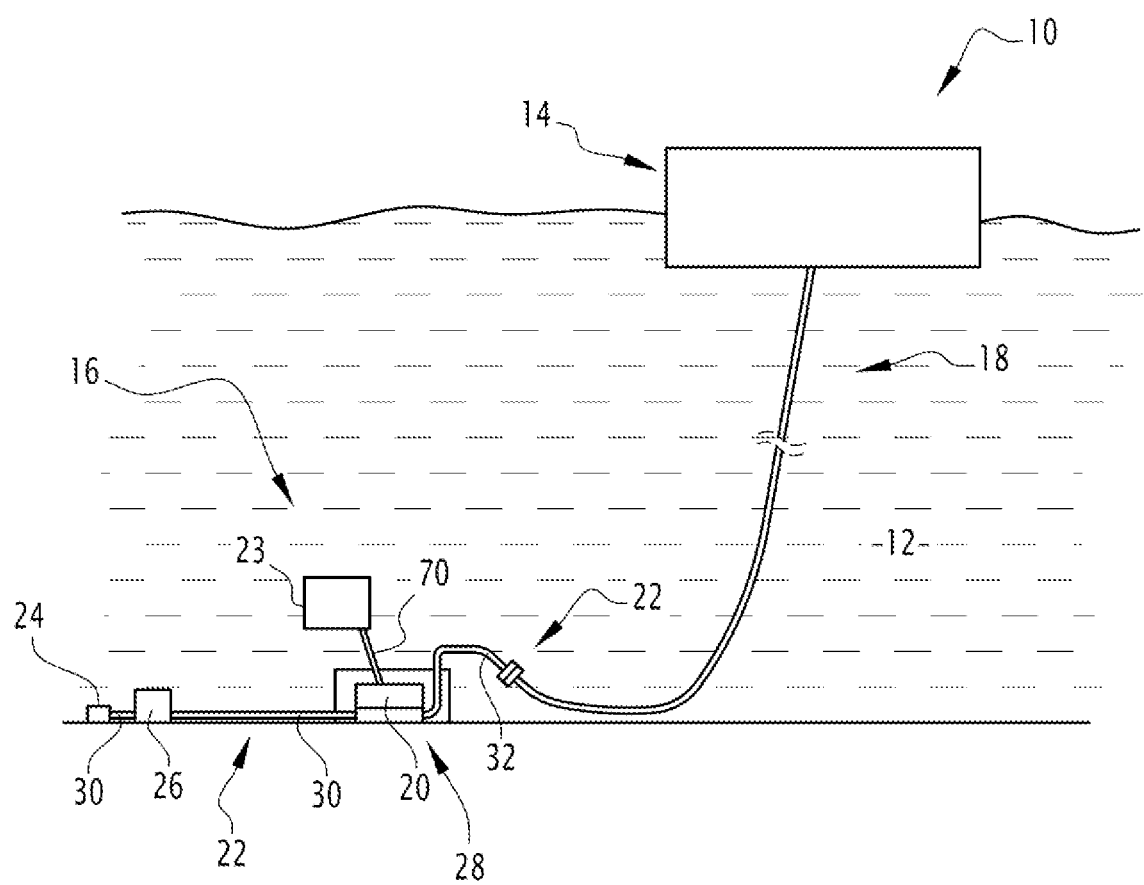
FIG. 6 is a view analogous to FIG. 1 illustrating the installation of an insulating cover according to the invention on a pipe element of a manifold.

In the embodiment shown in FIG. 6, the insulating cover 20 is placed over a pipe element present within a manifold 28.

The installation of the insulating cover 20 shown in FIG. 6 is otherwise analogous to the installation of the insulating cover 20 shown in FIG. 1.

The insulating covers 20 according to the invention are therefore partially advantageous, since they adapt to any geometry of the submerged element 22 to be protected, without having to provide or design specific shapes as in the case of a clamp.

Furthermore, there is no need to provide for special tolerances to fit to any geometry of the submerged element 22, as the deformable jacket 40 naturally fits over the submerged element 22 when liquid is drawn into the internal volume 44.

In addition, installation is simple, and can be carried out in confined spaces or spaces with difficult access, such as within a manifold 28, due to the high deformability of the deformable jacket 40. The deformable jacket 40 is simple to manufacture, and can be an off-the-shelf product directly available for installation in a fluid exploitation facility 10.

The insulating cover 20 according to the invention is simple to install, using a simple remotely operated vehicle 23, due to the buoyancy thereof equivalent to that of water. Thus, such an insulating cover 20 can be installed in any facility 10 provided with a remotely operated vehicle 23, without the need for a crane. The insulating cover 20 is also easily transportable on land or in the air, when the hollow internal volume 44 is free of water.

As discussed above, the installation of the insulating cover 20 is reversible and the insulating cover 20 can be moved to another position or removed in particular if a repair is deemed more urgent.

The thermal insulation properties of the insulating cover 20 are very good, due to the limitation of liquid convection through the deformable jacket 40 while the liquid is being pumped and due to the resulting aggregation of the insulating elements 46.

Because the deformable jacket 40 is resilient, it can expand slightly during the installation of the cover 40 without the need for an opening for external water.

In any event, the insulating cover 20 is simple to manufacture and inexpensive and can be quickly installed on or removed from a submerged element 22 of a fluid exploitation facility 10.

The invention claimed is:

1. An insulating cover to cover a submerged element of a fluid exploitation facility in a body of water, comprising:
    a deformable jacket, configured to be placed around a submerged element, the deformable jacket having an internal volume,
    a plurality of insulating elements arranged in the internal volume, the insulating elements being freely movable relative to one another;
    at least one access opening to selectively access the internal volume through the deformable jacket, the at least one access opening being configured to allow the internal volume to be flooded by a liquid during a deployment of the insulating cover towards the submerged element, and to allow suction of the liquid contained in the internal volume during an application of the insulating cover on the submerged element.

2. The cover according to claim 1, wherein the internal volume has a plurality of compartments separated from one another, each compartment of the plurality of compartments containing a plurality of insulating elements.

3. The cover according to claim 2, wherein the compartments of the plurality of compartments are fluidly connected to one another.

4. The cover according to claim 1, wherein the insulating elements are freely movable relative to the deformable jacket in the internal volume.

5. The cover according to claim 1, wherein the insulating elements are formed of polymer.

6. The cover according to claim 5, wherein the insulating elements are formed of polyolefin.

7. The cover according to claim 1, wherein the insulating elements are disjointed solid parts.

8. The cover according to claim 7, wherein the disjointed solid parts are balls or prismatic elements.

9. The cover according to claim 1, wherein the deformable jacket is formed of polymeric material.

10. The cover according to claim 9, wherein the polymeric material is rubber or/and polyolefin.

11. The cover according to claim 1, comprising at least an access valve configured to be activated by a remotely operated vehicle, the access valve being configured for selectively closing the at least one access opening.

12. The cover according to claim 1, comprising at least one solid flank extending the deformable jacket.

13. The cover according to claim 1, comprising at least one fastener integral with the deformable jacket, the at least one fastener being configured to be grasped by a remotely operated vehicle.

14. The cover according to claim 1, wherein the submerged element is a pipe or a connector.

15. A fluid exploitation facility through a body of water, comprising:
- a submerged element;
- a cover according to claim 1, applied on the submerged element.

16. A method to insulate an element of a fluid exploitation facility submerged in a body of water, comprising:
- providing a cover according to claim 1;
- flooding the internal volume with a liquid through the at least one access opening; and
- applying the deformable jacket on the submerged element;
- suctioning liquid from the internal volume through the at least one access opening;
- closing the at least one access opening and keeping the deformable jacket applied on the submerged element.

17. The method according to claim 16, wherein applying the deformable jacket on the submerged element and suctioning liquid from the internal volume through the at least one access opening are carried out by a remotely operated vehicle.

18. The method according to claim 16, comprising an additional flooding of the internal volume after the suctioning of liquid from the internal volume, and moving the deformable jacket away from the submerged element.

* * * * *